April 14, 1942.  R. A. CRAWFORD  2,279,859

MOLD LUBRICANT

Filed April 11, 1940

Inventor
Richard A. Crawford
By Willis F. Avery
Atty

Patented Apr. 14, 1942

2,279,859

UNITED STATES PATENT OFFICE 2,279,859

MOLD LUBRICANT

Richard A. Crawford, Akron, Ohio, assignor to The B. F. Goodrich Company, New York, N. Y., a corporation of New York Application April 11, 1940, Serial No. 329,180.

8 Claims. (Cl. 18—47)

This invention relates to the molding of rubber and analogous plastic materials in heated molds and has as its chief object the provision of a new and improved mold lubricant for use in the manufacture of heat-molded rubber and other plastic articles.

In the molding of plastic articles in heated molds it is oftentimes necessary to provide a mold lubricant between the plastic material and the mold surface to prevent sticking of the article to the mold. This is particularly true of rubber articles. Various materials have been proposed for this use, among them being soap bark, soap, lauryl sulfates, and various other lubricants intended to serve as a film between the rubber and the mold.

I have discovered a new and different mold lubricant operating on a different principle than other mold lubricants that have been proposed heretofore; one that is cheap, easily applied to the mold, and one that renders a molded rubber article easily removable from the mold with freedom from difficulties due to adhesion.

This new mold lubricant is a material that will decompose to evolve an inert gas at vulcanizing temperatures. This material is applied between the rubber and the surface of the mold, such as by spraying it in a water solution over the mold surface or by applying it to the rubber before it is placed in the mold. The inert gas that is evolved during the vulcanization forms a cushion evenly distributed between the rubber and the metal and facilitates the removal of the rubber article from the mold. As a preferred example of such gas-evolving materials I have found that potassium bicarbonate gives excellent results. This material is a solid which decomposes somewhat above the boiling point of water to evolve carbon dioxide and the resulting by-product compound, potassium carbonate, serves to clean the mold and keep it clean. The potassium bicarbonate may be dusted on the mold surface but I prefer to use it in a water solution containing from 0.5 per cent to 20 percent potassium bicarbonate by weight. As a practical matter I have found that a 1 per cent solution is to be recommended as it produces just enough gas to prevent adhesion without evolving too much gas or leaving an excessive amount of potassium carbonate on the mold. This solution may conveniently be sprayed on the mold prior to inserting the vulcanizable rubber mixture. Due to the fact that the solution cleans the mold and keeps it clean economies are realized in the manufacturing by reducing the labor and time spent in cleaning molds between the manufacturing operations.

This invention may be explained by means of the accompanying drawing, of which

Figure 1:
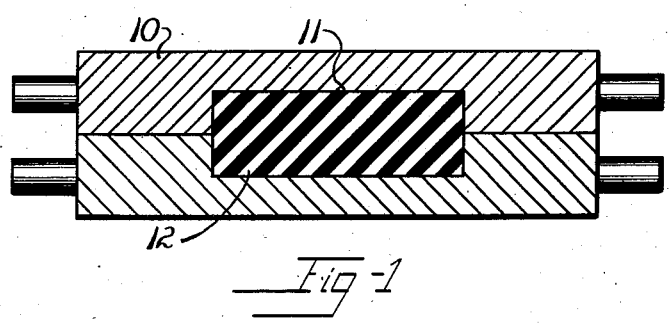
Fig. 1 is a cross-sectional elevation of a mold coated with the mold lubricant of this invention and containing rubber to be vulcanized.
Figure 2:
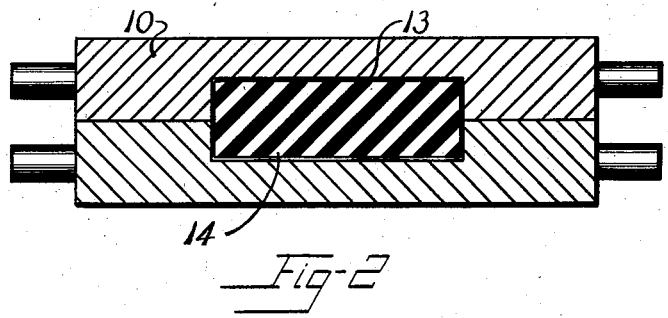
Fig. 2 is a cross-sectional elevation of the same mold while the rubber is being vulcanized by the application of heat.

By the method of this invention there is provided a mold 10 having an inner recess of the shape of the desired rubber article. On the surface of this mold there is brushed, in a preferred example, a 1.0% solution of potassium bicarbonate in water and the mold cavity 11 is filled with a vulcanizable rubber mixture 12. The mold is heated, as with steam, to vulcanize the rubber and during this heating carbon dioxide gas is evolved to form a thin cushion 13 around the molded rubber article 14. This evolved gas serves to prevent the rubber from sticking to the mold surface. For purposes of illustration the gas cushion is shown in magnified thickness.

There are other gas-evolving materials that may be used in this invention besides the preferred potassium bicarbonate. It is better if one is chosen that gives off an inert, non-irritating gas, however, and likewise a compound preferably should be chosen that undergoes the decomposition at the ordinary vulcanizing temperatures. One example of another gas-evolving material that may be used is ammonium carbonate, which acts very much like the preferred potassium bicarbonate.

In modified embodiments of the invention, materials may be used that normally decompose to evolve gas at temperatures higher than those desirably employed in the molding operation, and these materials are then used in combination with other materials that serve to lower this temperature of decomposition. A good example of this is a mixture of sodium bicarbonate and stearic acid.

It is understood that any material may be used as the mold lubricant in this invention that will evolve a gas at molding temperatures, and that the principles herein set forth may be employed in molding a variety of heat-moldable plastic materials in addition to rubber. The invention accordingly is intended to have unlimited protection within the spirit and scope of the appended claims.

I claim:

1. The method of preventing adhesion between a mold and a heat-moldable plastic material being heat-molded therein which comprises interposing between the mold surface and the plastic material a composition comprising a carbonate compound capable of being decomposed during the heat-molding operation to release gaseous carbon dioxide.

2. The method of preventing the adhesion of rubber to a mold surface during a heat-molding and vulcanizing process which comprises interposing between the rubber and the mold surface composition comprising a carbonate compound capable of being decomposed during the heat-molding and vulcanizing operation to release gaseous carbon dioxide.

3. The method of preventing the adhesion of rubber to a mold surface during a heat-molding and vulcanizing process which comprises interposing between the rubber and the mold surface a film comprising a solution of a composition comprising a carbonate compound capable of being decomposed during the heat-molding and vulcanizing operation to release gaseous carbon dioxide.

4. The method of preventing the adhesion of rubber to a mold surface during a heat-molding process which comprises interposing potassium bicarbonate between the rubber and the mold surface.

5. The method of preventing the adhesion of rubber to a mold surface during a heat-molding process which comprises interposing between the rubber and the mold surface a film comprising an aqueous solution of potassium bicarbonate.

6. The method of preventing the adhesion of rubber to a mold surface during a heat-molding process which comprises interposing between the rubber and the mold surface a film comprising an aqueous solution containing from 0.5 to 20 per cent by weight of potassium bicarbonate.

7. The method of preventing the adhesion of rubber to a mold surface during a heat-molding process which comprises interposing between the rubber and the mold surface a film comprising an aqueous solution containing approximately one per cent by weight of potassium bicarbonate.

8. The method of preventing the adhesion of rubber or similar plastic material to a mold surface during a heat-molding and vulcanizing operation which comprises interposing between the rubber and the mold surface a carbonate compound which normally decomposes to evolve a gas only at a temperature higher than that employed in the molding and vulcanizing operation, and causing the carbonate compound to decompose and evolve a gas during the molding and vulcanizing operation by associating with it an acid material adapted to lower its temperature of decomposition.

RICHARD A. CRAWFORD.